May 17, 1949.  F. E. WILLIAMS  2,470,449
PHOSPHOR MATERIALS
Filed Oct. 17, 1945
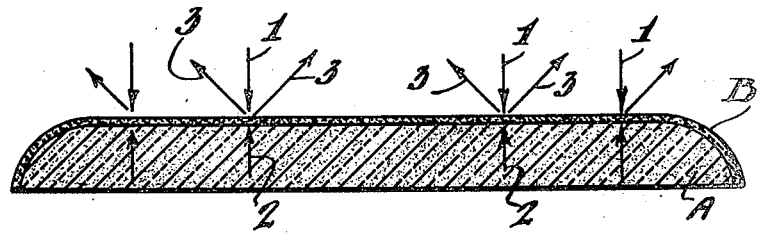
INVENTOR.
Ferd E. Williams
BY
Charles McClain
ATTORNEY Patented May 17, 1949

2,470,449

UNITED STATES PATENT OFFICE 2,470,449

PHOSPHOR MATERIALS

Ferd E. Williams, Princeton, N. J., assignor to Radio Corporation of America, a corporation of Delaware Application October 17, 1945, Serial No. 622,825

1 Claim. (Cl. 250—80)

This invention relates to phosphor materials and particularly to materials emitting red light upon suitable excitation.

In my application filed October 17, 1945, Serial No. 622,824, now Patent 2,447,448, I have disclosed a phosphor exceedingly efficient in the emission of red light under ultra-violet excitation, which is admirably adapted for use in airplane instrument dials and panels for night flying, as well as for many other uses. The red light emitted by that phosphor under ultra-violet excitation does not reduce the efficiency of the dark-adapted eye to see objects in the prevailing dim blue light of the night sky. The phosphor disclosed in that application was therefore a marked improvement over the prior art phosphors used in the airplane dials which emitted green light, because green light reduces the ability of the dark-adapted eye to see airplanes and other objects at night in the upper atmosphere where blue light prevails.

In certain uses the phosphors in the instrument dials of airplanes are excited by ultra-violet light projected thereon from an appropriate generator, such as a suitable mercury vapor lamp. In case of failure of this source, a stand-by exciter is required. For the stand-by excitation radium salts or equivalent radiating materials are used, as described in my said application. These are incorporated in or adjacent to the phosphor, so that the ultra-violet light produced by action of the radium emanation on the phosphor in turn activates it to cause a cascading effect for emission of the desired red light.

The phosphor of my said application, however, was not all that might be desired when relying solely upon radium excitation and it is the object of this invention to provide a phosphor material or materials which have high efficiency under ultra-violet light excitation and also very satisfactory efficiency under excitation by radium or equivalent emanation.

Another object of the invention is to provide a phosphor having a phosphor material that is highly efficient under ultra-violet or other suitable light excitation and another phosphor relatively more efficient in emitting ultra-violet under excitation by radium or equivalent, the ultra-violet in turn exciting the first-mentioned phosphor material to cause it to emit red light.

Other objects of the invention will appear in the following specification, reference being had to the drawing, in which:

The single figure of the drawing illustrates a phosphor embodying my invention.

Referring to the drawing, the material A of the dial, or other part, consists of a suitable plastic or other material containing a phosphor with an emission spectrum between 2000 Å. and 4500 Å., which includes the ultra-violet wave length band. The layer or coating B contains a phosphor highly efficient in the emission of red light under ultra-violet excitation, as at 1, which would be produced by an ultra-violet generator, such as a suitable lamp of the mercury vapor type, not shown. The radium material in layer or coating A excites the phosphor of that layer to emit ultra-violet light, as at 2. The combined emission at 1 and 2 causes the layer B to emit red light, as at 3.

If, through accident, the ultra-violet generator fails so that the phosphor B is not excited by the ultra-violet light at 1, the ultra-violet at 2, produced by action of the radium emanation, causes the phosphor B to emit red light in sufficient amount.

The layer or coating B contains, preferably, the material of my said co-pending application having the composition $4MgO.GeO_2$, which gives maximum red light emission under ultra-violet excitation. The efficiency of this compound is 600% greater in red light emission than the prior art magnesium-germanium material having the composition $2MgO.GeO_2$, which is ortho proportion. It is understood that both forms of the magnesium-germanium material have efficient activators, such as a manganese compound having a manganese molar content of 0.0001 to .01, as given in my said application.

The layer or coating A of this application may contain one of several efficient phosphor materials, for example, zinc sulphide activated by silver (ZnS:Ag) or calcium triphosphate activated by cerium ($Ca_3(Po_4)_2$:Ce). The latter phosphor emits ultra-violet predominantly, but the ZnS:Ag phosphor is the more efficiently excited by alpha particles.

Other materials may be used for the radium-excited phosphor A, such as calcium tungstate and zinc oxide.

Since the desired emission from layer B is red light, it should be of suitable thickness to minimize the amount of blue light from layer A passing therethrough.

In practicing this invention, 100 milligrams of cerium-activated calcium phosphate per square centimeter of light-emitting surface, as disclosed in the patent of W. A. Roberts, No. 2,306,567, is suspended in a binder sold under the designation PO1-943, type B, U. S. radium binder, and applied to a suitable surface, such as gold foil, containing 1200 micrograms of radium per square inch of surface, but any suitable plastic binder, of which there are numerous examples, may be used. While the coating is still wet, 10 milligrams per square centimeter of the magnesium-germanium material $4MgO.GeO_2: .01Mn$ is sifted thereonto. Still greater efficiency in the action of the radium may be obtained by precipitating it as a salt on the crystals of the phosphor in coating A.

Various modifications may be made in the materials and in their application without departing from the spirit of the invention.

Having described my invention, what I claim is:

A compound phosphor consisting of calcium phosphate, a cerium activator therefor, a radium compound intermingled with said calcium phosphate and a coating of magnesium-germanate material with manganese activator having greater magnesium oxide content than ortho proportions.

FERD E. WILLIAMS.

REFERENCES CITED

The following references are of record in the file of this patent:

UNITED STATES PATENTS

| Number | Name | Date |
| --- | --- | --- |
| 2,066,044 | Leverenz | Dec. 29, 1936 |
| 2,182,860 | Addink | Dec. 12, 1939 |
| 2,306,567 | Roberts | Dec. 29, 1942 |
| 2,312,268 | Roberts | Feb. 23, 1943 |

FOREIGN PATENTS

| Number | Country | Date |
| --- | --- | --- |
| 474,907 | Great Britain | Nov. 9, 1937 |

OTHER REFERENCES

"Fluorochemistry," Jack De Ment, published 1945, by Chemical Publishing Co., Inc., Brooklyn, N. Y. (Copy of book in Div. 3 of the Patent Office).